US006234038B1

(12) United States Patent
Loeffler

(10) Patent No.: US 6,234,038 B1
(45) Date of Patent: May 22, 2001

(54) SHIFT RAIL AND FORK SUPPORT ASSEMBLY FOR A VEHICULAR TRANSMISSION

(75) Inventor: John M. Loeffler, Whitehouse, OH (US)

(73) Assignee: Transmission Technologies Corporation, Farmington Hills, MI (US)

( * ) Notice: Subject to any disclaimer, the term of this patent is extended or adjusted under 35 U.S.C. 154(b) by 0 days.

(21) Appl. No.: 09/322,413

(22) Filed: May 28, 1999

Related U.S. Application Data

(60) Provisional application No. 60/087,019, filed on May 28, 1998.

(51) Int. Cl.$^7$ .................................................. B60K 20/00
(52) U.S. Cl. .................................. 74/473.37; 74/473.35; 74/473.25
(58) Field of Search ........................... 74/473.25, 473.36, 74/473.37, 336 R, 335; 477/109, 107

(56) References Cited

U.S. PATENT DOCUMENTS

| 3,626,781 | 12/1971 | Moser ..................................... 74/477 |
| 3,857,299 | 12/1974 | Morrison ............................. 74/473 R |
| 4,273,004 | 6/1981 | Morrison et al. .................. 74/473 R |
| 4,449,416 | * 5/1984 | Huitema ............................ 74/336 R |
| 4,827,793 | 5/1989 | Loeffler et al. ........................ 74/477 |
| 5,018,404 | 5/1991 | Muller ................................... 74/477 |
| 5,285,694 | 2/1994 | Chene ................................... 74/477 |
| 5,468,197 | * 11/1995 | Loeffler ................................. 477/99 |
| 5,476,021 | 12/1995 | Burger ................................... 74/475 |
| 5,816,101 | * 10/1998 | Weston ................................... 74/331 |
| 5,893,293 | * 4/1999 | Earp ...................................... 74/335 |

FOREIGN PATENT DOCUMENTS 3012764   10/1981   (DE) .

* cited by examiner

Primary Examiner—Sherry Estremsky
Assistant Examiner—Tisha D. Lewis
(74) Attorney, Agent, or Firm—MacMillan, Sobanski & Todd, LLC

(57) ABSTRACT

A shift rail and fork assembly for a transmission includes a shift channel having a pair of side pieces that are connected together by cross pieces. A plurality of shift rails are supported on the shift channel for relative sliding movement. A corresponding plurality of shift forks are supported on the shift channel for relative sliding movement. The shift rails are connected to the shift forks for concurrent longitudinal movement. A cross slide is supported on the shift channel for relative lateral movement. The cross slide including a depending tang that selectively cooperates with corresponding slots formed each of the shift rail for concurrent movement. The cross slide can be moved laterally such that the selector tangs engage any desired one of the shift rails. An interlock bracket is also supported for lateral movement relative to the shift channel, but is prevented from longitudinal movement. To initiate a shifting operation, a shift lever is first moved in the lateral direction to select one of the shift rails, causing lateral movement of both the cross slide and the interlock bracket. The lateral movement of the cross slide causes selector tangs provided thereon to become laterally aligned with a slot formed in a selected one of the shift rails. At the same time, the lateral movement of the interlock bracket causes depending arm portions provided thereon to become laterally aligned with slots formed in all of the other non-selected shift rails. Then, the shift lever is subsequently moved in a longitudinal direction, causing the cross slide, the selected one of the shift rails, and the shift channel to be moved longitudinally therewith. The interlock bracket prevents the non-selected shift rails from moving longitudinally.

19 Claims, 8 Drawing Sheets

SHIFT RAIL AND FORK SUPPORT ASSEMBLY FOR A VEHICULAR TRANSMISSION

CROSS REFERENCE TO RELATED APPLICATION

This application claims the benefit of U.S. Provisional Application No. 60/087,019, filed May 28, 1998.

BACKGROUND OF THE INVENTION

This invention relates in general to transmissions for selectively providing a desired speed reduction gear ratio between an input shaft and an output shaft. In particular, this invention relates to a system for supporting the shift rails and shift forks for selective sliding movement in a manually shifted vehicular transmission.

In virtually all land vehicles in use today, a transmission is provided in a drive train between a source of rotational power, such as an internal combustion or diesel engine, and the driven axle and wheels of the vehicle. A typical transmission includes a case containing an input shaft, an output shaft, and a plurality of meshing gears. Means are provided for connecting selected ones of the meshing gears between the input shaft and the output shaft to provide a desired speed reduction gear ratio therebetween. The meshing gears contained within the transmission case are of varying size so as to provide a plurality of such gear ratios. By appropriately shifting among these various gear ratios, acceleration and deceleration of the vehicle can be accomplished in a smooth and efficient manner.

Many transmission structures are known in the art for performing these gear ratio selections manually, i.e., in response to some physical exertion by the driver of the vehicle. In a conventional manual transmission, the driver grasps and moves an upper portion of a pivotable shift lever to effect shifting of the transmission. In response thereto, a lower portion of the shift lever engages and moves one of a plurality of shift rails provided within the transmission. The shift rails are typically supported within the transmission case for sliding movement from a central neutral position either axially forwardly to a first gear engaging position or axially rearwardly to a second gear engaging position. Thus, the selection and movement of a particular shift rail causes certain ones of the meshing gears to be connected between the input shaft and the output shaft. As a result, a desired gear ratio is provided between the input shaft and the output shaft. Manually operated transmissions of this general type are well known in the art and are relatively simple, inexpensive, and lightweight in structure and operation. Because of this, the majority of medium and heavy duty truck transmissions in common use today are manually operated.

Typically, the shift rails extend longitudinally throughout the transmission and are supported at their ends by a pair of bearing blocks. The shift rails can be individually selected and longitudinally shifted by a shift lever so as to provide a desired one of a plurality of gear ratios between the input shaft and the output shaft of the transmission. To accomplish this, each of the shift rails has a shift fork secured thereto. The shift forks extend downwardly from the shift rails into engagement with respective clutches contained within the transmission. As is well known, axial movements of the shift rails (and the shift forks secured thereto) cause the associated clutches to selectively connect the appropriate gears contained within the transmission to drive the output shaft at a desired speed reduction gear ratio relative to the input shaft.

Usually, mechanical fasteners, such as rivets, are used to secure the shift forks to their associated shift rails. Thus, longitudinal movement of a shift rail causes corresponding longitudinal movement of its associated shift fork. Although this structure has been effective, it has been found that the rivets used to secure the shift forks to the shift rails can work loose during use, causing premature failure. Thus, it would be desirable to provide an improved structure for supporting the shift rails and shift forks for selective sliding movement in a vehicular transmission.

SUMMARY OF THE INVENTION

This invention relates to a shift rail and fork assembly for use in a manually shifted vehicular transmission. The shift rail and fork assembly includes a shift channel having a pair of side pieces that are connected together by a plurality of cross pieces. A plurality of shift rails are supported on the cross pieces of the shift channel for sliding movement relative thereto. A corresponding plurality of shift forks are supported on guide rails provided on the shift channel for sliding movement relative thereto. Each of the shift rails has a depending tab provided thereon that engaged a corresponding recess formed an associated one of the shift forks. As a result, the shift rails are connected to the shift forks for longitudinal movement therewith. A cross slide is supported on the shift channel for lateral movement relative thereto. The cross slide including a depending tang that selectively cooperates with corresponding slots formed each of the shift rail for movement therewith. The cross slide can be moved laterally such that the selector tangs engage any desired one of the shift rails. An interlock bracket is also supported for lateral movement relative to the shift channel, but is prevented from longitudinal movement. To initiate a shifting operation, a shift lever is initially moved in the lateral direction to select one of the shift rails for subsequent longitudinal movement. Such lateral movement of the shift lever causes lateral movement of both the cross slide and the interlock bracket. The lateral movement of the cross slide causes selector tangs provided thereon to become laterally aligned with a slot formed in a selected one of the shift rails. At the same time, the lateral movement of the interlock bracket causes depending arm portions provided thereon to become laterally aligned with slots formed in all of the other non-selected shift rails. To complete the shifting operation, the shift lever is subsequently moved in a longitudinal direction. When the shift lever is moved longitudinally, the cross slide, the selected one of the shift rails, and the shift channel are moved longitudinally therewith. The interlock bracket prevents the non-selected shift rails from moving longitudinally.

Various objects and advantages of this invention will become apparent to those skilled in the art from the following detailed description of the preferred embodiments, when read in light of the accompanying drawings.

DETAILED DESCRIPTION OF THE PREFERRED EMBODIMENT

Figure 1:
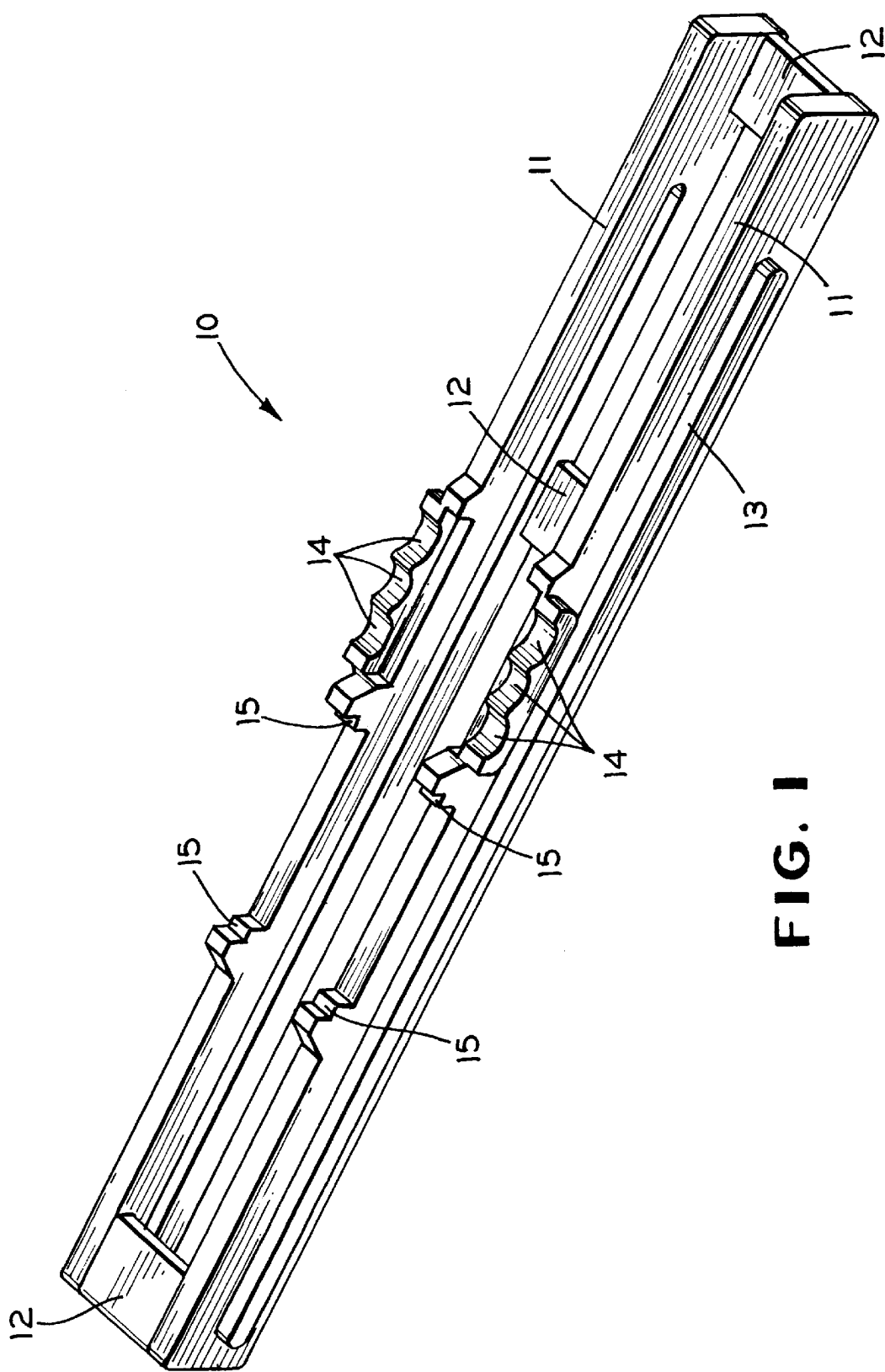
FIG. 1 is a perspective view of a transmission shift channel in accordance with is invention.
Figure 2:
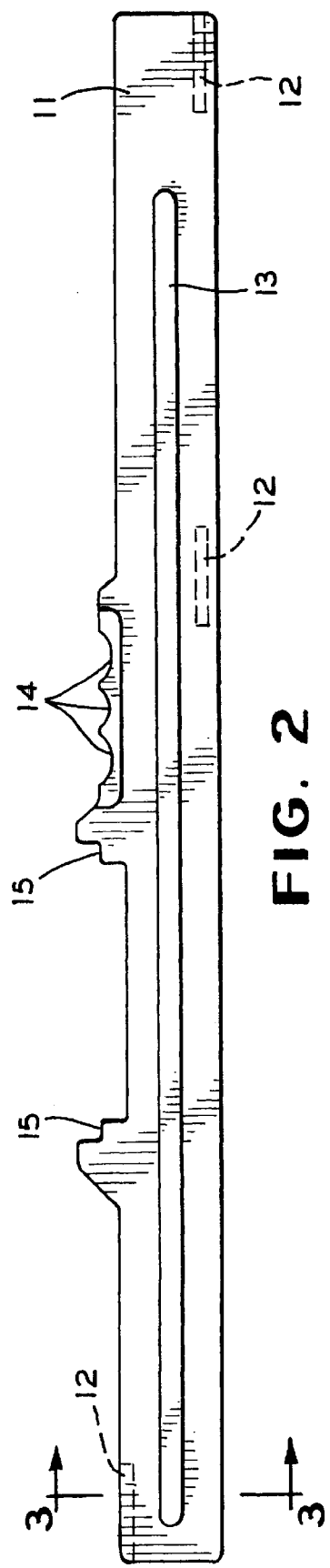
FIG. 2 is a side elevational view of the transmission shift channel illustrated in FIG. 1.
Figure 3:
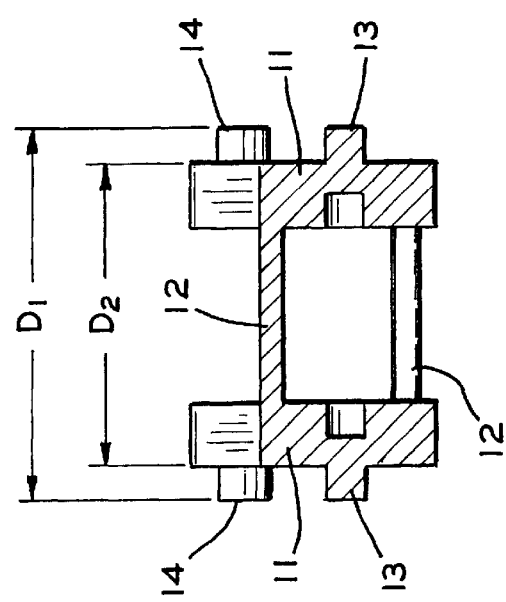
FIG. 3 is a sectional elevational view of the transmission shift channel taken long line 3—3 of FIG. 2.

Referring now to the drawings, there is illustrated in FIGS. 1, 2, and 3 a transmission shift channel, indicated generally at 10, that is adapted for use in a conventional manually shifted vehicular transmission in accordance with this invention. The transmission shift channel 10 includes a pair of elongated side pieces 11 having one or more cross pieces 12 extending therebetween. In the illustrated embodiment, three of such cross pieces 12 are secured in any conventional manner to the two parallel side pieces 11. However, a greater or less number of such cross pieces 12 may be provided as desired. Preferably, at least one of the cross pieces 12 (the left cross piece 12 in FIG. 2) is offset from the other cross pieces 12 (the center and right cross pieces 12 in FIG. 2) to provide structural stability to the shift channel 10 as a whole. The side pieces 11 and the cross pieces 12 can be formed from any desired material, and are preferably formed from a strong rigid metallic material, such as steel, aluminum, and alloys thereof.

At least one, and preferably both, of the side pieces 11 has a guide rail 13 formed thereon. In the illustrated embodiment, the guide rails 13 are formed integrally with the side pieces 11 and extend laterally from and longitudinally along most of the opposed outer surfaces thereof. For example, as best shown in FIG. 3, the side pieces 11 may be stamped or otherwise deformed to form the guide rails 13. However, the guide rails 13 may be formed or otherwise provided on the side pieces 11 in any desired manner and in any desired location. As best shown in FIG. 3, the outwardly facing surfaces of the two side pieces 11 define a first distance $D_1$, while the outwardly facing surfaces of the two guide rails 13 provided on such side pieces 11 define a second distance $D_2$ that is greater than the first distance $D_1$. The purpose for such guide rails 13 and the dimensional relationship therebetween will be explained below.

At least one, and preferably both, of the side pieces 11 further has one or more locator recesses 14 formed thereon. The locator recesses 14 may be embodied as a series of curved recesses formed in the upper surfaces of the side pieces and may, as best shown in FIG. 3, extend laterally from the side pieces 11. The purpose for such locator recesses will be also explained below. Lastly, a pair of cross slide recesses 15 are formed in at least one, and preferably both, of the side pieces 11. The cross slide slots 15 are also preferably formed on the upper surfaces of the side pieces 11 and are provided for a purpose that will also be explained below. Both the locator depressions 14 and cross slide slots 15 may, if desired, be formed simultaneously with the guide rails 13 in the manner described above.

Figure 4:
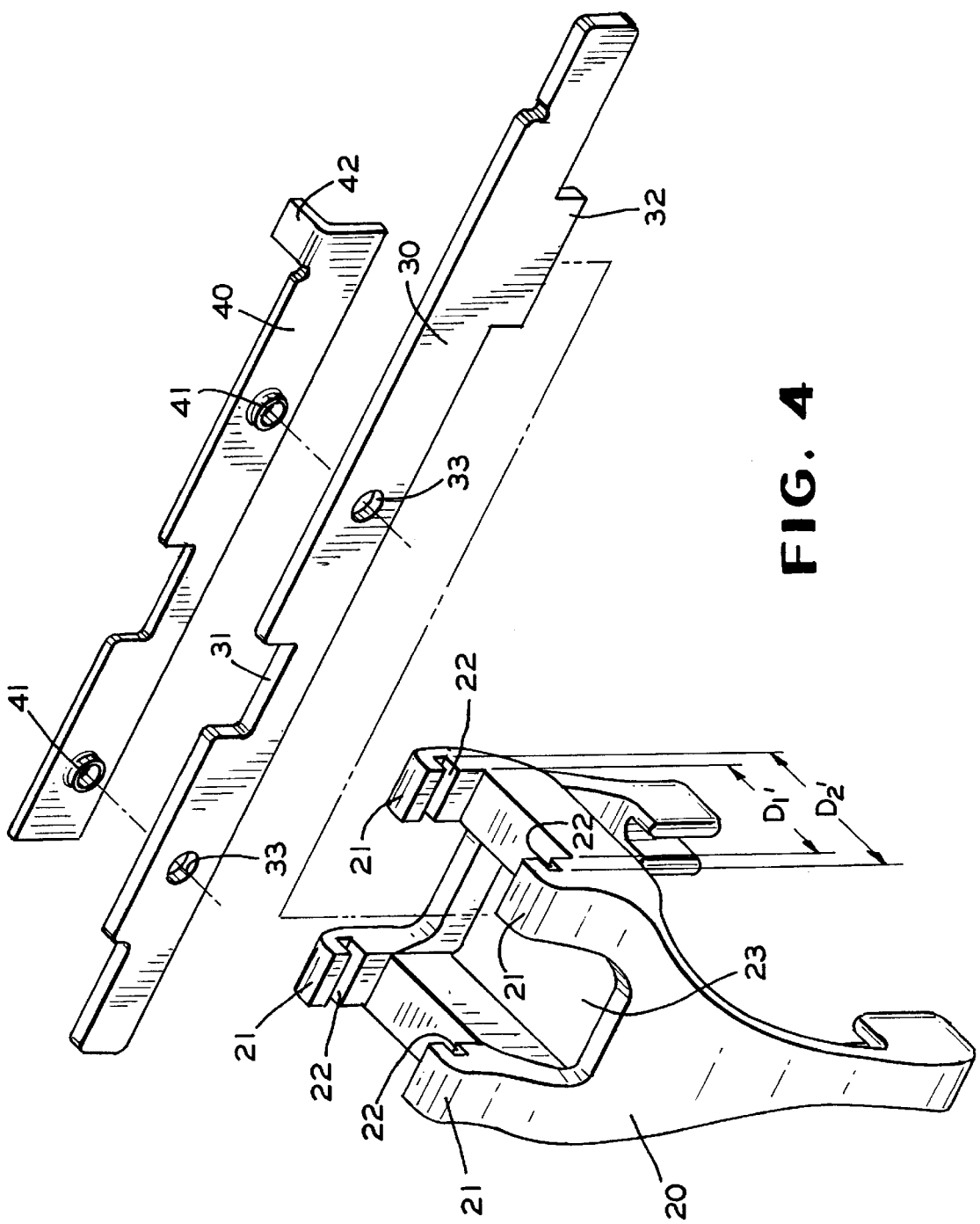
FIG. 4 is an exploded perspective view of a shift rail, a half rail, and a shift fork prior to installation in the transmission shift channel illustrated in FIGS. 1, 2, and 3.
Figure 5:
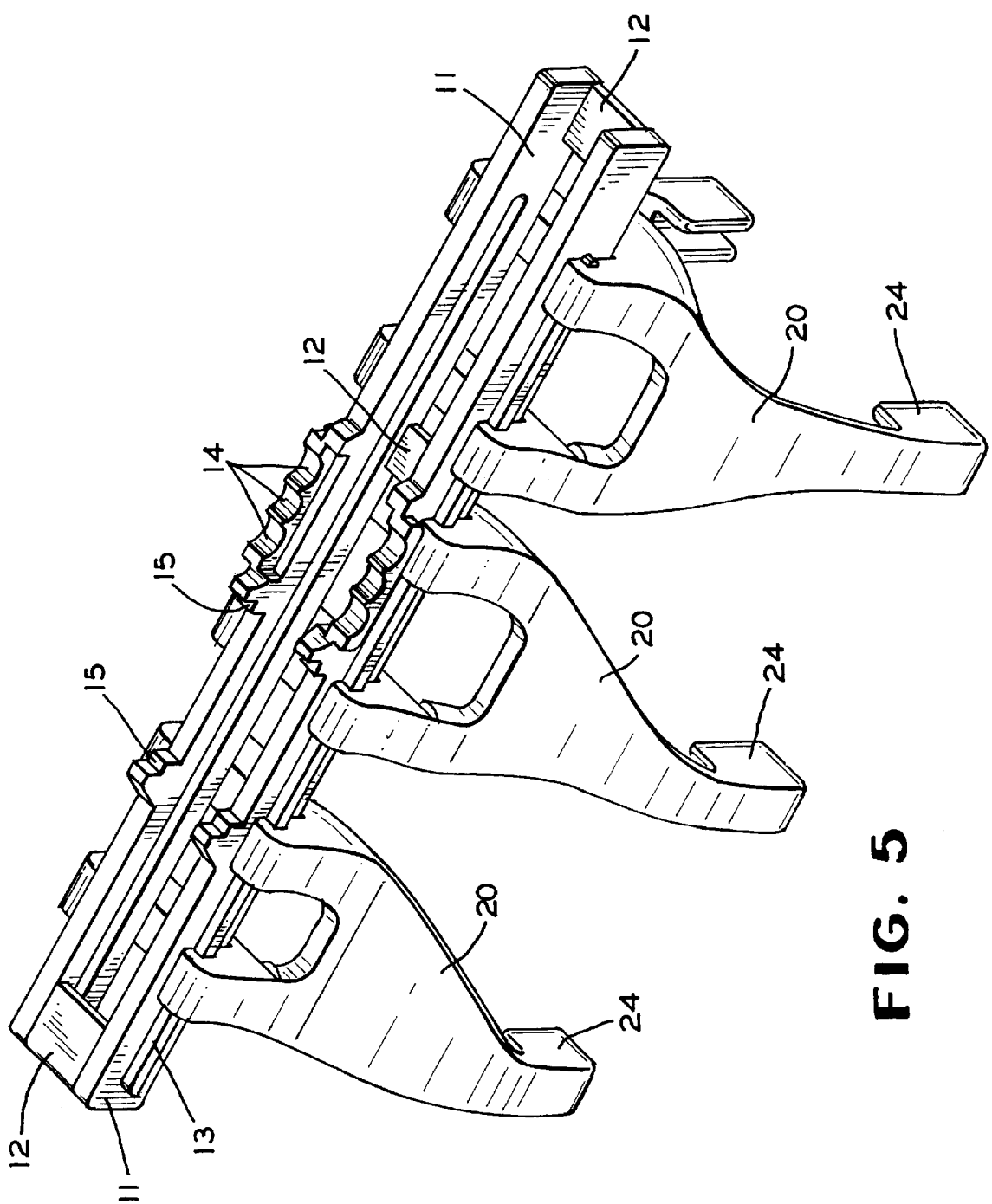
FIG. 5 is a perspective view showing a plurality of the shift forks illustrated in FIG. 4 assembled with and slidably supported on the transmission shift channel illustrated in FIGS. 1, 2, and 3.

At least one (and preferably a plurality of) shift forks 20 are supported on the shift channel 10 for movement relative thereto. As best shown in FIG. 4, each of the shift forks 20 includes a plurality of support arms 21 (each of which has a groove 22 formed therein), a recess 23, and a depending fork arm 24. The opposed support arms 21 are separated by a third distance $D_1'$, while the bottom surfaces of the recesses 23 formed on those support arms 21 are separated by a fourth distance $D_2'$ that is greater than the third distance $D_1'$. The third distance $D_1'$ is slightly larger than the first distance $D_1$, while the fourth distance $D_2'$ is slightly greater than the second distance $D_2$. As a result, the shift forks 20 can be supported on the shift channel 10 by sliding the guide rails 13 through the grooves 22, as shown in FIG. 5. Thus, it will be appreciated that the shift forks 20 are supported on the shift channel 10 for relative sliding movement. It will be appreciated that the shift forks 20 may be directly supported on the side pieces 11 without the use of the guide channels 13 if desired.

Figure 6:
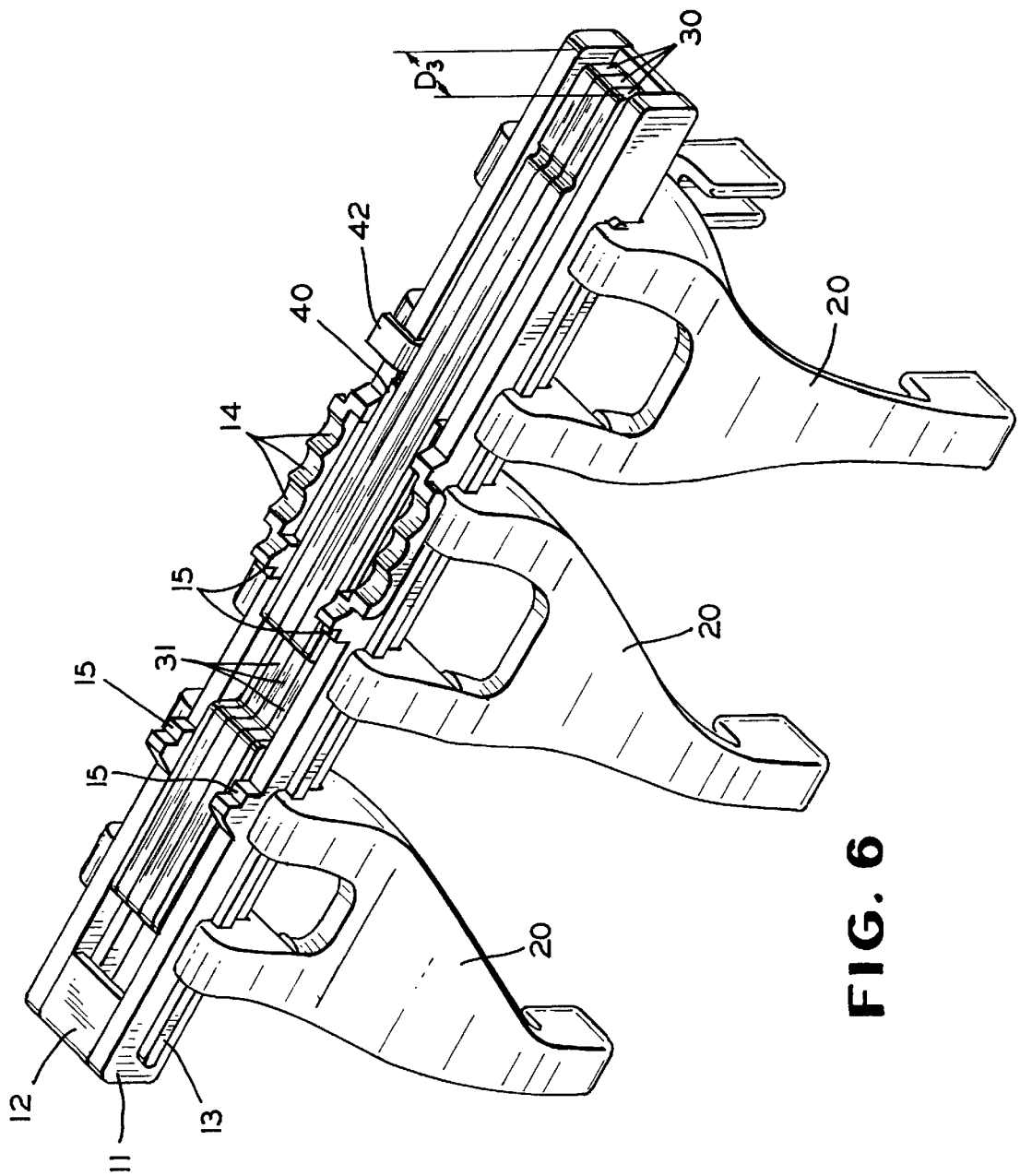
FIG. 6 is a perspective view showing a plurality of the shift rails and the half rail illustrated in FIG. 4 assembled with and slidably supported on the transmission shift channel illustrated in FIG. 5 to provide a shift rail and fork assembly, wherein the shift rails cooperate with the shift forks for concurrent movement.

A shift rail, such as shown at 30 in FIG. 4, is associated with each of the shift forks 20. Each of the illustrated shift rails 30 is generally flat and elongated in shape, having a slot 31 formed on an upper surface thereof and a tab 32 formed on a lower surface thereof. The purpose for the slots 31 will be explained below. However, it should be noted that the slots 31 on each of the shift rails 30 are adapted to be laterally aligned with one another, as shown in FIG. 6. Thus, the slots 31 are preferably formed at approximately the same longitudinal position on each of the shift rails 30. The tabs 32 are sized and positioned to be received within the recesses 23 formed in the associated shift forks 20. As shown in FIGS. 5 and 6, the shift forks 20 are longitudinally offset from one another on the shaft channel 10. Thus, the tabs 32 are preferably formed at differing longitudinal positions on each of the shift rails 30. One or more holes 33 or other connecting structures are formed through the shift rail 30, also for a purpose that will be explained below.

Also shown in FIG. 4 is a half rail 40 that is associated with one of the shift rails 30. The illustrated half rail 40 is generally flat and elongated in shape, having one or more lateral protrusions 41 or other connecting structures formed therein that are sized to cooperate with the holes 33 formed through the associated shift rail 30. Thus, when the half rail 40 is assembled with the associated shift rail 30 as shown in FIG. 6, the half rail 40 and the shift rail 30 are connected together for concurrent movement. However, any other structures may be provided to connect the half rail 40 and the shift rail 30 together for concurrent movement. The illustrated half rail 40 further includes a tab 42 that extends laterally over the upper surface of one of the side pieces 11. The purpose for the half rail 40 and the tab 42 will be explained below.

Figure 7:
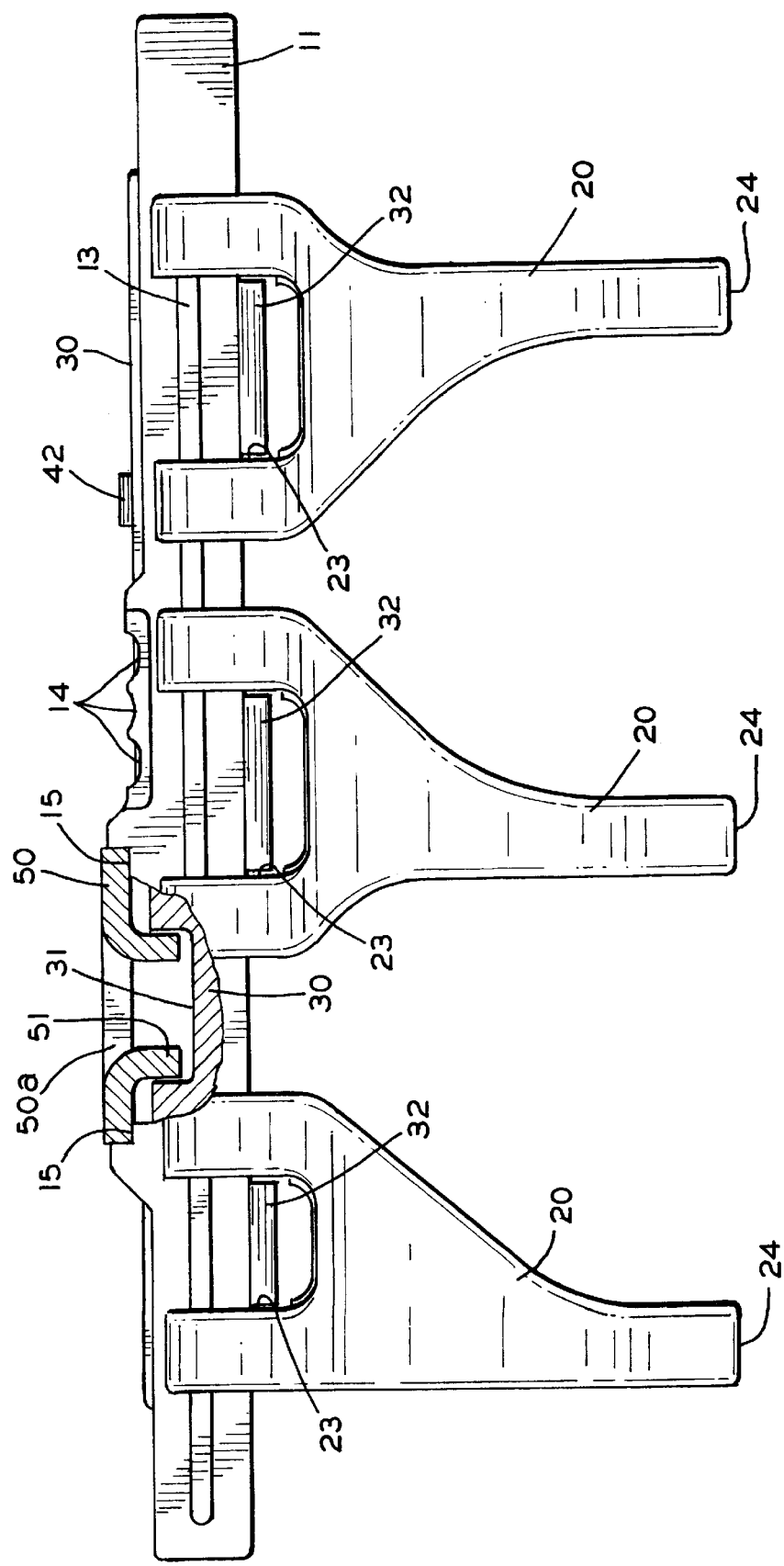
FIG. 7 is a side elevational view, partially broken away, of the shift rail and fork assembly illustrated in FIG. 6 showing a cross slide supported on the side pieces and engaged with one of the shift rails.

The shift rails 40 are supported on the shift channel 10 for sliding movement relative thereto. To accomplish this, the shift rails 40 can be supported on one or more of the cross pieces 13 for such sliding movement. As shown in FIG. 6, the inwardly facing surfaces of the side pieces 11 define an interior distance $D_3$. This interior distance $D_3$ can be varied to accommodate any desired number of shift rails 30 between the two side pieces 11. Preferably, the interior distance $D_3$ is sized to accommodate four of the shift rails 30. If, as in the illustrated embodiment, only three of such shift rails 40 are required, the remaining space of the interior distance $D_3$ may be occupied by one or more of the half rails 40. Thus, as shown in FIG. 6, the shift channel 10 may support three shift rails 30, a first half rail 40 located adjacent to one side piece 11 and a second half rail (not shown) located adjacent to the other side piece 11. Preferably, the second half rail is not provided with the tab 42. As mentioned above, each of the shift rails 30 is connected (by means of the tabs 32 and the recesses 23, as shown in FIG. 7) to an associated one of the shift forks 20 for longitudinal movement relative to the shift channel 10. The combination of the shift channel 10, the shift forks 20, and the shift rails 30 define a shift rail and fork assembly for use in a manually shifted transmission, as will be described further below.

Figure 9:
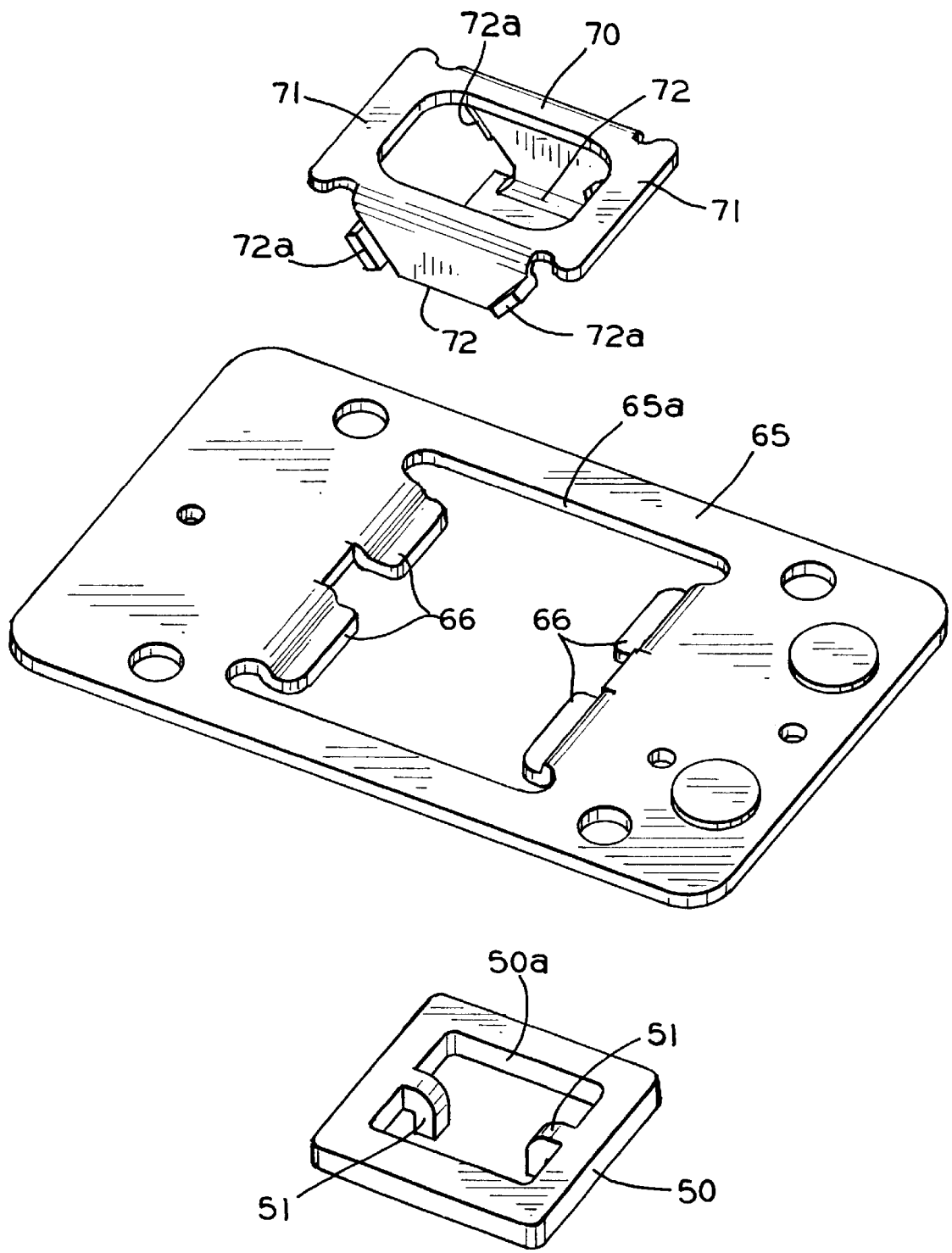
FIG. 9 is an exploded perspective of the cross slide, the support plate, and the interlock bracket illustrated in FIG. 8.

As shown in FIG. 7, a cross slide 50 is supported on the cross slide recesses 15 of the shift channel 10 for lateral sliding movement relative thereto. The structure of the cross slide 50 is best illustrated in FIG. 9. As shown therein, the cross slide 50 is formed from a generally flat piece of stock having an opening 50a formed therethrough. A pair of selector tangs 51 extend within the opening 50a and downwardly therefrom. When the cross slide 50 is installed on the shift channel 10, the selector tangs 51 extend downwardly into cooperation with the slot 31 formed in the upper surface of one of the shift rails 30. Preferably, the longitudinal distance between the two selector tangs 51 is only slightly smaller than the longitudinal distances of the slots 31 formed in the shift rails 30. Also, the lateral width of the selector tangs 51 is preferably slightly smaller than the lateral width of each of the shift rails 30. As mentioned above, the cross slide 50 is supported on the cross slide recesses 15 of the shift channel 10 for lateral sliding movement relative thereto. Thus, in a manner described in detail below, the cross slide 50 can be moved laterally such that the selector tangs 51 engage any desired one of the shift rails 30.

Figure 8:
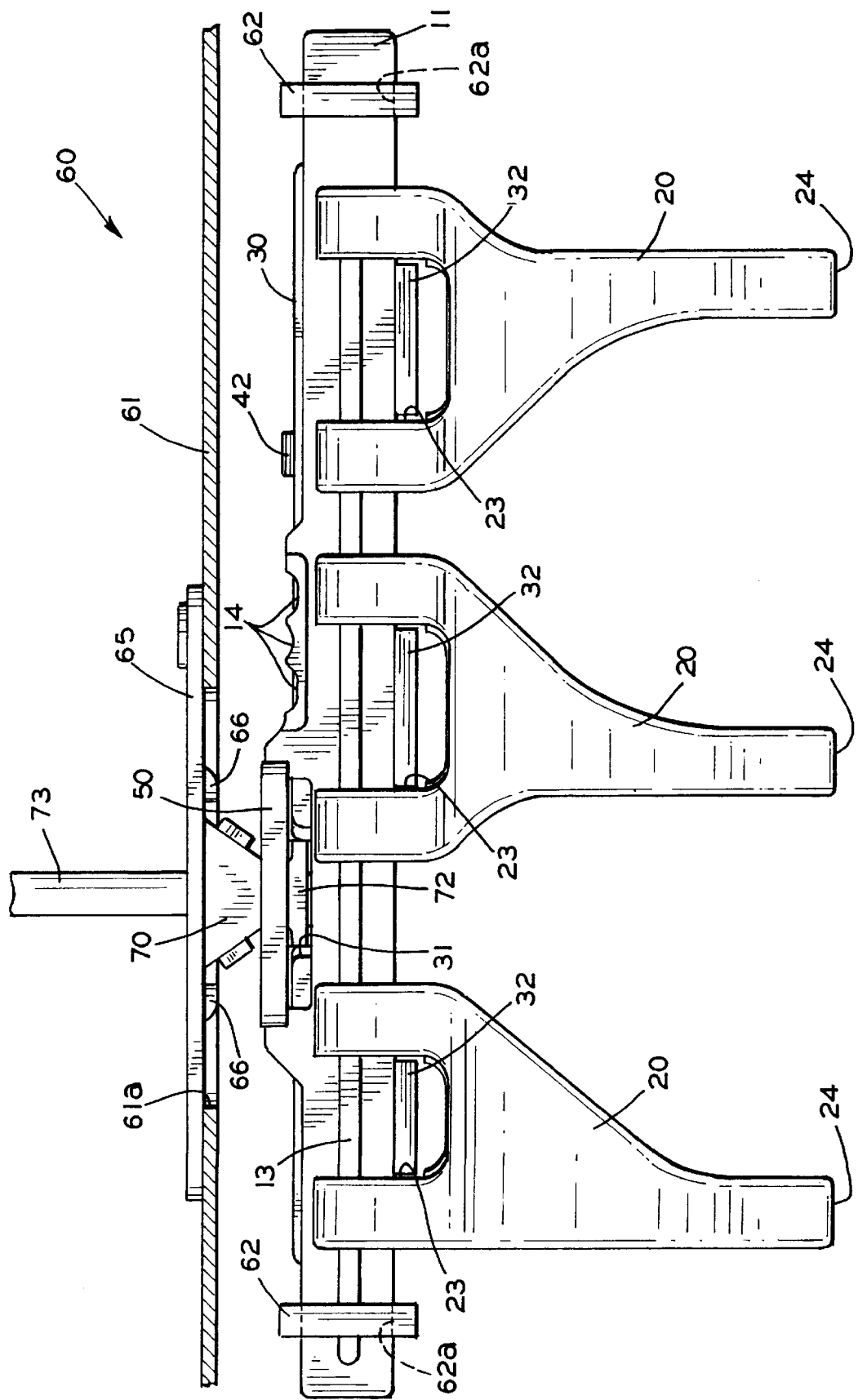
FIG. 8 is a side elevational view of a portion of a transmission having the shift rail and fork assembly, the cross slide, a support plate, and an interlock bracket installed thereon.

Referring now to FIG. 8, there is illustrated a portion of a transmission, indicated generally at 60, in accordance with this invention. The transmission 60 is, in large measure, conventional in the art and includes a case 61 having an input shaft (not shown) extending therein, an output shaft (not shown) extending therein, and a plurality of gears (not shown) supported within the case 61. A pair of mounting brackets 62 are mounted on the case 61. Each of the mounting brackets 62 has an opening (indicated by dotted lines 62a) formed therethrough. The openings 62a are sized to receive the shift rail and fork assembly therein for movement relative thereto. Thus, the side pieces 11 slidably engage the opposed sides of the openings 62a formed through the mounting brackets 62.

An opening 61a is formed through the upper portion of the case 61, and a support plate 65 is secured to the case 61 about the opening 61a. The structure of the support plate 65 is illustrated in detail in FIG. 9. As shown therein, the support plate 65 is formed from generally flat stock and has an opening 65a formed therethrough. One or more support tabs 66 are formed on the support plate 65 and extend inwardly into the opening 65a. The support tabs 66 are provided to slidably support an interlock bracket 70 thereon for lateral movement relative thereto. The structure of the interlock bracket 70 is also illustrated in detail in FIG. 9. As shown therein, the interlock bracket 70 includes a pair of end portions 71 that are sized and shaped to engage the support tabs 66 to support the interlock bracket 70 on the support plate 65 for lateral movement relative thereto. The interlock bracket 70 further includes a pair of depending arm portions 72 that extend downwardly from the end portions 71. As best shown in FIG. 8, the arm portions 72 of the interlock bracket 70 extend downwardly into cooperation with slots 31 formed in the upper surfaces of the shift rails 30. A pair of protrusions 72a are formed on each of the arms portions 72 for a purpose that will be explained below. Lastly, a shift lever 73 is provided for effecting movement of the various components thus far described to operate the transmission 70. The shift lever 73 is conventional in the art and is typically supported on a shift tower (not shown) secured to the upper surface of the case 61 for pivoting movement in both the lateral and longitudinal directions. The lower end of the shift lever 73 extends downwardly into cooperation with both the interlock bracket 70 and the cross slide 50.

When the shift rail and fork assembly is mounted in the transmission 60 as shown in FIG. 8, the depending arms 24 of the shift forks 20 extend into cooperation with respective clutches (not shown) for connecting the input shaft through selected ones of the transmission gears to the output shaft in a known manner. To accomplish this, each of the shift forks 20 typically can be moved either longitudinally forwardly or rearwardly from a central neutral position to engage different ones of the transmission gears for use. By providing appropriately sized gears within the transmission 60, a desired one of a plurality of speed reduction gear ratios can be achieved between the input shaft and the output shaft.

The operation of the transmission 70 will now be described. To initiate a shifting operation, the shift lever 73 is initially moved in the lateral direction to select one of the shift rails 30 for subsequent longitudinal movement. Such lateral movement of the shift lever 73 causes lateral movement of both the cross slide 50 and the interlock bracket 70. The lateral movement of the cross slide 50 causes the selector tangs 51 thereof to become laterally aligned with the slot 31 formed in a selected one of the shift rails 30. At the same time, the lateral movement of the interlock bracket 70 causes the depending arm portions 72 thereof to become laterally aligned with the slots 31 formed all of the other non-selected shift rails 30. Throughout all of this lateral movement of the shift lever 73, the cross slide 50, and the interlock bracket 70, none of the shift rails 30 are moved in the longitudinal direction.

To complete the shifting operation, the shift lever 73 is subsequently moved in a longitudinal direction (either forwardly or rearwardly, depending upon the particularly gear ratio desired) to engage the gears in the transmission 70 such that the input shaft rotatably drives the output shaft. As mentioned above, the selector tangs 51 of the cross slide 50 are laterally aligned with the slot 31 formed in a selected one of the shift rails 30. Thus, longitudinal movement of the shift lever 73 causes corresponding longitudinal movement of the cross slide 50 and the selected one of the shift rails 30. As also mentioned above, the cross slide 50 is supported on the shift channel 10 for relative lateral movement. However, longitudinal movement of the cross slide 50 relative to the shift channel 10 is not permitted. Thus, when the shift lever 73 is moved longitudinally, not only are the cross slide 50 and the selected one of the shift rails 30 moved longitudinally, but additionally the shift channel 10 is moved longitudinally therewith. Thus, the shift channel 10 is moved longitudinally relative to the support brackets 62 during this longitudinal movement of the shift lever 73.

As also mentioned above, the half rail 40 is connected to one of the shift rails 30 for longitudinal movement therewith. It is contemplated that the half rail 40 be connected to the shift rail 30 that, when moved longitudinally, engages the gears contained within the transmission 60 for reverse movement of the vehicle. When the shift rail 30 and the half rail 40 are moved in such a longitudinal direction as to engage the reverse gears contained within the transmission 60, the tab 42 can be moved into engagement with a back-up light switch (not shown). The back-up light switch is conventional in the art and is adapted to turn on the reverse lights of the vehicle (or any other desired device, such as an audible alarm) when the transmission is engaged for reverse movement of the vehicle.

As mentioned above, the side pieces 11 have a plurality of locator recesses 14 formed thereon. The locator recesses 14 are positioned to be selectively engaged by a spring-loaded detent mechanism (not shown) provided on the case 61 of the transmission 60. The spring-loaded detent mechanism is conventional in the art and is adapted to engage the locator recesses 14 so as to provide tactile feedback to an operator as to the longitudinal movement of the shift channel 10 during a shifting operation.

As the selected one of the shift rails is moved longitudinally, it is very important that the remaining non-selected shift rails 30 remain in their central neutral positions to prevent undesirable clashing of the gears contained in the transmission 60. The interlock bracket 70 is provided to accomplish this. As mentioned above, the lateral movement of the interlock bracket 70 causes the depending arm portions 72 thereof to become laterally aligned with the slots 31 formed all of the other non-selected shift rails 30. As also mentioned above, the interlock bracket 70 is supported on the support plate 65 for relative lateral movement. However, longitudinal movement of the interlock bracket 70 relative to the support plate 65 is not permitted. Thus, when the shift lever 73 is moved longitudinally, the interlock bracket 70 is prevented from moving longitudinally. Thus, all of the other non-selected shift rails 30 are also prevented from moving longitudinally as well. As a result, when the cross slide 50, the selected one of the shift rails 30, and the shift channel 10 are moved longitudinally, the interlock bracket 70 and the remaining non-selected shift rails 30 are remain stationary. Thus, the interlock bracket 70 and the remaining non-selected shift rails 30 are maintained in their central neutral positions during this longitudinal movement of the shift lever 73.

As mentioned above, a pair of protrusions 72a are formed on each of the arms portions 72 of the interlock bracket 70. When the shift rail and fork assembly is mounted in the transmission 60 as shown in FIG. 8, the protrusions 72a are disposed adjacent to the upper surface of the cross slide 50. The protrusions 72a function as a positive stop to prevent the cross slide 50 from moving upwardly out of engagement with the cross slide recesses 15 formed in the side pieces 11. Thus, the interlock bracket 70 functions to maintain the cross slide 50 in engagement with the cross slide recesses 15 for lateral sliding movement.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A transmission shift rail and fork assembly for use in a transmission comprising:
   a shift channel;
   a shift rail supported on said shift channel for movement relative thereto; and
   a shift fork slidably engaged with said shift channel for movement relative thereto, a portion of said shift fork being engaged with a portion of said shift rail for movement therewith.

2. The transmission shift rail and fork assembly defined in claim 1 wherein said shift channel includes a pair of side pieces connected together by at least one cross piece.

3. The transmission shift rail and fork assembly defined in claim 2 wherein said shift rail is supported on said cross piece.

4. The transmission shift rail and fork assembly defined in claim 1 wherein said shift channel has a guide rail formed thereon, and wherein said shift fork is slidably engaged with said guide rail for movement relative thereto.

5. The transmission shift rail and fork assembly defined in claim 4 wherein said shift channel has a pair of guide rails formed thereon, and wherein said shift fork is slidably engaged with said guide rails for movement relative thereto.

6. The transmission shift rail and fork assembly defined in claim 1 wherein said shift channel includes a pair of side pieces connected together by a plurality of cross pieces and said shift rail is supported on said plurality of cross pieces, and wherein each of said side pieces has a guide rail formed thereon and said shift fork is supported on said guide rails.

7. The transmission shift rail and fork assembly defined in claim 1 further including a cross slide supported on said shift channel for movement relative thereto, said cross slide including a tang that selectively engages said shift rail for movement therewith.

8. The transmission shift rail and fork assembly defined in claim 7 wherein said shift rail and said shift fork are supported on said shift channel for movement relative thereto in a first direction, and wherein said cross slide is supported on said shift channel for movement relative thereto in a second direction different from said first direction, said tang selectively engaging said shift rail for causing movement of said shift channel and said cross slide for movement with said shift rail and said shift fork.

9. A transmission comprising:
   a case;
   an input shaft extending within said case;
   an output shaft extending within said case;
   a plurality of gears supported within said case; and
   a shift rail and fork assembly including a shift channel supported on said case for movement relative thereto, a shift rail supported on said shift channel for movement relative thereto, and a shift fork slidably engaged with said shift channel for movement relative thereto, a portion of said shift fork being engaged with a portion of said shift rail for movement therewith, wherein movement of said shift fork causes said input shaft to be connected through said plurality of gears to said output shaft.

10. The transmission defined in claim 9 wherein said shift channel includes a pair of side pieces connected together by at least one cross piece.

11. The transmission defined in claim 10 wherein said shift rail is supported on said cross piece.

12. The transmission defined in claim 9 wherein said shift channel has a guide rail formed thereon, and wherein said shift fork is slidably engaged with said guide rail for movement relative thereto.

13. The transmission defined in claim 12 wherein said shift channel has a pair of guide rails formed thereon, and wherein said shift fork is slidably engaged with said guide rails for movement relative thereto.

14. The transmission defined in claim 9 wherein said shift channel includes a pair of side pieces connected together by a plurality of cross pieces and said shift rail is supported on said plurality of cross pieces, and wherein each of said side pieces has a guide rail formed thereon and said shift fork is supported on said guide rails.

15. The transmission defined in claim 9 further including a pair of support brackets mounted on said case and having respective openings formed therethrough, said shift channel extending through said openings of said support brackets so as to be supported on said case for movement relative thereto.

16. The transmission defined in claim 9 further including a cross slide supported on said shift channel for movement relative thereto, said cross slide including a tang that selectively engages said shift rail for movement therewith.

17. The transmission defined in claim 16 wherein said shift rail and said shift fork are supported on said shift channel for movement relative thereto in a first direction, and wherein said cross slide is supported on said shift channel for movement relative thereto in a second direction different from said first direction, said tang selectively engaging said shift rail for causing movement of said shift channel and said cross slide for movement with said shift rail and said shift fork.

18. The transmission defined in claim 16 wherein said case has an opening formed therethrough, an interlock plate is secured to said case about said opening, and an interlock bracket is supported on said interlock plate for movement relative thereto.

19. The transmission defined in claim 18 wherein said interlock plate has an opening formed therethrough, and a shift lever has a portion that extends through said opening formed through said interlock plate into engagement with said interlock bracket and said cross slide for effecting movement thereof.

* * * * *